(12) United States Patent
Abe

(10) Patent No.: US 6,272,294 B1
(45) Date of Patent: Aug. 7, 2001

(54) REAL-IMAGE FINDER OPTICAL SYSTEM

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,414

(22) Filed: Jan. 18, 2000

(30) Foreign Application Priority Data

Jan. 19, 1999 (JP) .................................................. 11-011007

(51) Int. Cl.$^7$ ..................................................... G03B 13/02
(52) U.S. Cl. ........................... 396/384; 396/386; 359/834
(58) Field of Search .................................... 396/152, 384, 396/385, 386, 373; 359/833, 834, 837

(56) References Cited

U.S. PATENT DOCUMENTS

| | | | |
|---|---|---|---|
| 5,752,107 | * | 5/1998 | Hasushita et al. .................... 396/386 |
| 6,018,417 | * | 1/2000 | Yano ..................................... 396/384 |
| 6,058,273 | * | 5/2000 | Abe ...................................... 396/384 |

* cited by examiner

Primary Examiner—Alan A. Mathews
(74) Attorney, Agent, or Firm—Greenblum & Bernstein, P.L.C.

(57) ABSTRACT

A real-image finder optical system including a positive objective optical system in which an image of an object, being upside down and reversed from left to right, is formed; an erecting optical system, having a plurality of reflection surfaces, in which the image formed by the objective optical system is erected to the same orientation as the object; and an eyepiece optical system through which the image erected by the erecting optical system is viewed. A shape of a finder field of view is a rectangle having major sides along the transverse direction in the finder field of view. Along the optical path on the side of the object with respect to the image formed by the objective optical system, at least three reflection surfaces of the erecting optical system are provided, and further, the most object-side reflection surface is positioned so that the optical axis is deflected in a direction along the major side of the rectangular finder field of view.

7 Claims, 5 Drawing Sheets

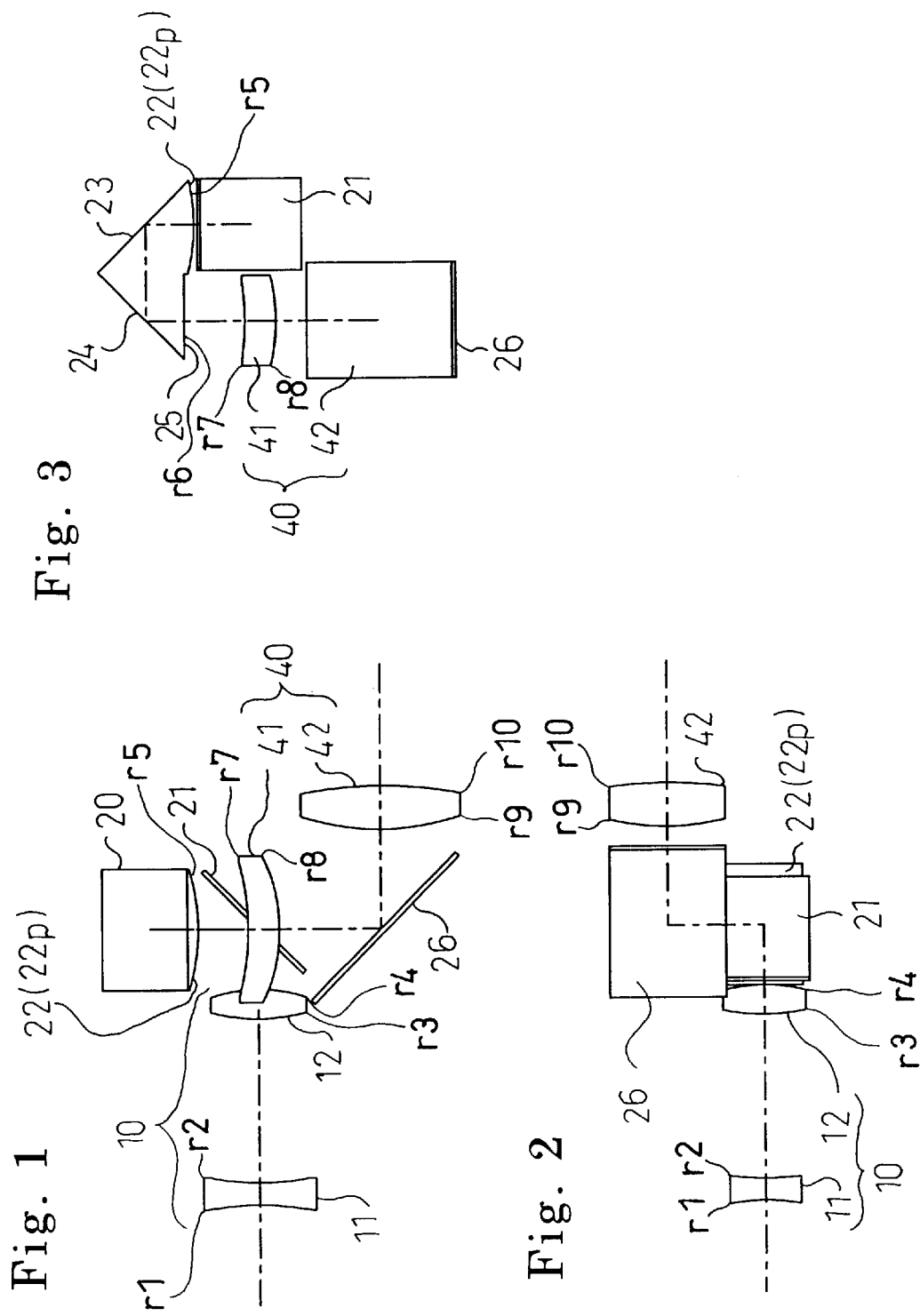

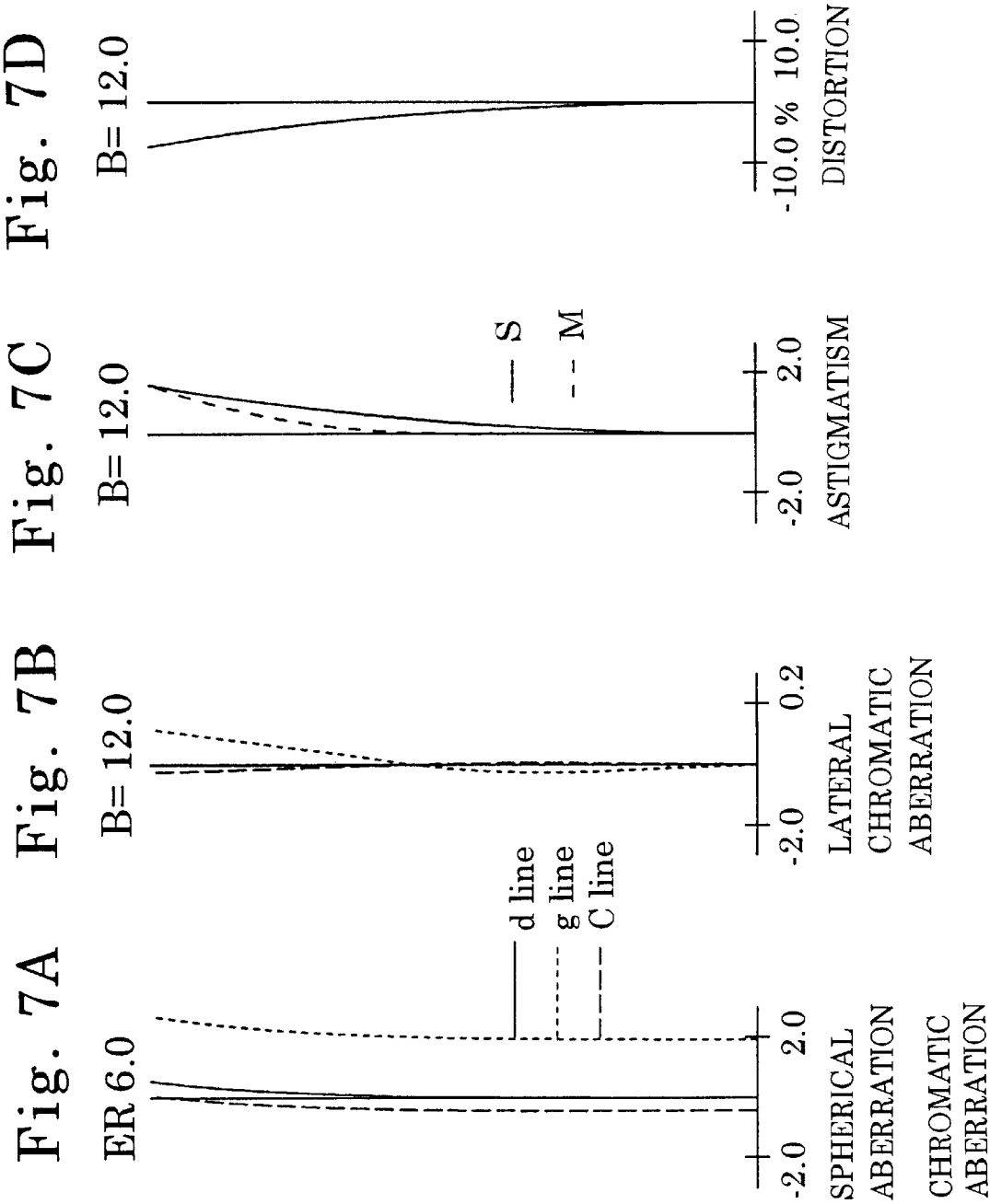

REAL-IMAGE FINDER OPTICAL SYSTEM

BACKGROUND OF THE INVENTION

1. Field of the Invention

The present invention relates a real-image finder optical system.

2. Description of the Related Art

In a lens-shutter type camera, a real-image finder optical system, which is provided independently from the photographing optical system, generally includes a positive objective optical system, an erecting optical system, and a positive eyepiece optical system. In the real-image finder optical system, the objective optical system forms an inverted image which is upside down and reversed from left to right, and the erecting optical system erects the inverted image to the proper orientation. The erected image is viewed through the eyepiece optical system. In such an erecting optical system, a Porro prism having four reflection surfaces is generally used. Further, an erecting optical system is usually provided between the inverted image formed by the objective optical system and the eyepiece optical system.

In the above explained prior art, since an erecting optical system is provided between the inverted image formed by the objective optical system and the eyepiece optical system, the optical path from the inverted image to the eyepiece optical system is long. Therefore the focal length of the eyepiece optical system has to be made longer. However, if the focal length of the eyepiece optical system is long, the finder magnification ($f_o/f_E$; $f_o$: the focal length of the objective optical system; $f_E$: the focal length of the eyepiece optical system) becomes lower, which results in a decrease of the apparent visual angle. Due to this decreased the apparent visual angle, an operator feels difficulties in observing an image through the eyepiece optical system, and further the quality the image is deteriorated.

The size of the eyepiece optical system in the radial direction is substantially determined by the apparent visual angle and the eye relief. More specifically, the larger the apparent visual angle and the eye relief become, the larger the eyepiece optical system is in the radial direction. Furthermore, the size of the light emitting surface of the erecting optical system is substantially the same as the final surface of the eyepiece optical system. In addition, it is understood that the optical path length of the erecting optical system is approximately three times as long as the diameter of the light emitting surface of the erecting optical system. Therefore if the eye relief and the apparent visual angle are made larger, the optical path length of the erecting optical system is inevitably made longer, and thereby the finder magnification decreases as explained. Subsequently, the erecting optical system is made larger, and finally the entire finder optical system has to be made larger.

SUMMARY OF THE INVENTION

It is an object of the present invention to provide a miniaturized real-image finder optical system in which the focal length of the eyepiece optical system can be made shorter, and the finder magnification and the apparent visual angle can be increased.

The present invention is based on the following conceptions:

(i) the optical path length between the image (formed by the objective optical system) and the eyepiece optical system, i.e., the focal length of the eyepiece optical system, is made shorter, and thereby the finder magnification and the apparent visual angle are made larger; and (ii) the optical path length of the erecting optical system is made shorter, and the erecting optical system itself is made smaller, while a longer eye relief and a larger apparent visual angle are secured.

In order to attain the first conception (item (i)), among reflection surfaces required for the erecting optical system, at least three reflection surfaces are positioned on the side of the object with respect to the image formed by the objective optical system. According to this arrangement, the erecting optical system is constituted even if the focal length of the eyepiece optical system is made shorter.

In order to attain the second conception (item (ii)), the number of reflection surfaces between the image and the eyepiece optical system is reduced.

In order to achieve the above mentioned object, there is provided a real-image finder optical system including a positive objective optical system in which an image of an object, being upside down and reversed from left to right, is formed; an erecting optical system, having a plurality of reflection surfaces, in which the image formed by the objective optical system is erected to the same orientation as the object; and an eyepiece optical system through which the image erected by the erecting optical system is viewed. A shape of a finder field of view is a rectangle having major sides along the transverse direction in the finder field of view. Along the optical path on the side of the object with respect to the image formed by the objective optical system, at least three reflection surfaces of the erecting optical system are provided, and further, the most object-side reflection surface is positioned so that the optical axis is deflected in a direction along the major side of the rectangular finder field of view.

In the reflection surfaces of the erecting optical system, the second and third reflection surfaces, in this order from the object, are preferably two reflection surfaces of a prism. Moreover, between the most object-side reflection surface and the second reflection surface, a positive lens element is preferably provided. This positive lens element can integrally be formed on an incident surface of the prism.

Including a case where the positive lens element is integrally formed on the incident surface of the prism, when the positive lens element is provided between the most object-side reflection surface and the second reflection surface, the following condition is preferably satisfied:

$$0.1 < L/fc < 0.7 \tag{1}$$

wherein

L designates the distance between the most image-side surface of the objective optical system and the positive lens element; and fc designates the focal length of the positive lens element.

An emitting surface of the prism is preferably provided on an image forming position of the objective optical system. Further, on the emitting surface of the prism, finder-field information can be formed.

The present disclosure relates to subject matter contained in Japanese Patent Application No. Hei-11-11007 (filed on Jan. 19, 1999) which is expressly incorporated herein by reference in its entirety.

BRIEF DESCRIPTION OF THE DRAWINGS

The invention will be discussed below in detail with reference to the accompanying drawings, in which:

FIG. 1 is a plan view of a first embodiment of a real-image finder optical system according to the present invention;

FIG. 2 is a side view of the real-image finder optical system shown in FIG. 1;

FIG. 3 is a rear elevation of the real-image finder optical system shown in FIG. 1;

FIGS. 7A, 7B, 7C and 7D show aberration diagrams of he real-image optical system shown in FIG. 6.

DESCRIPTION OF THE PREFERRED EMBODIMENTS

Figure 4:
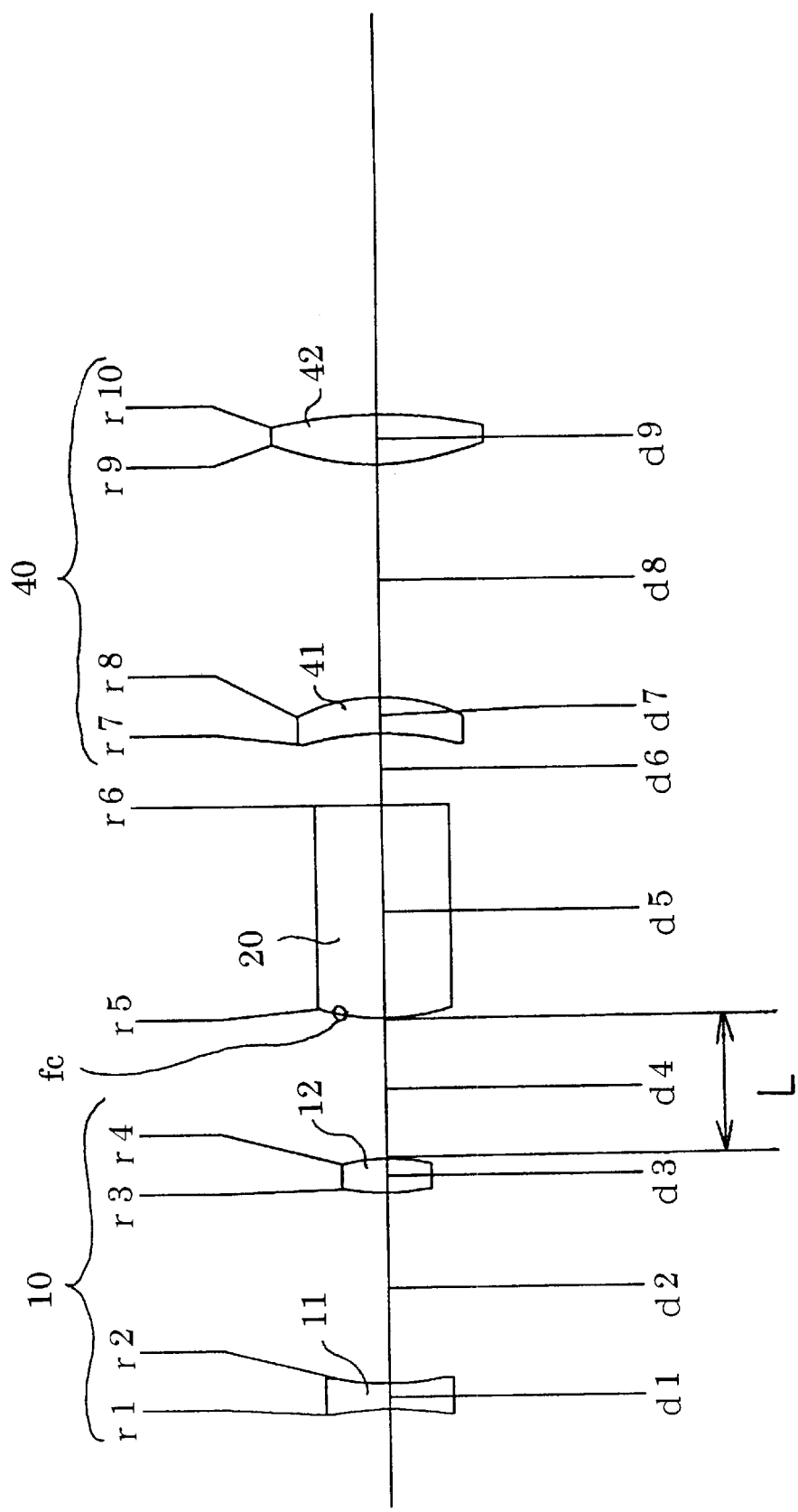
FIG. 4 is an optical arrangement the real-image finder optical system according the first embodiment.
Figure 5:
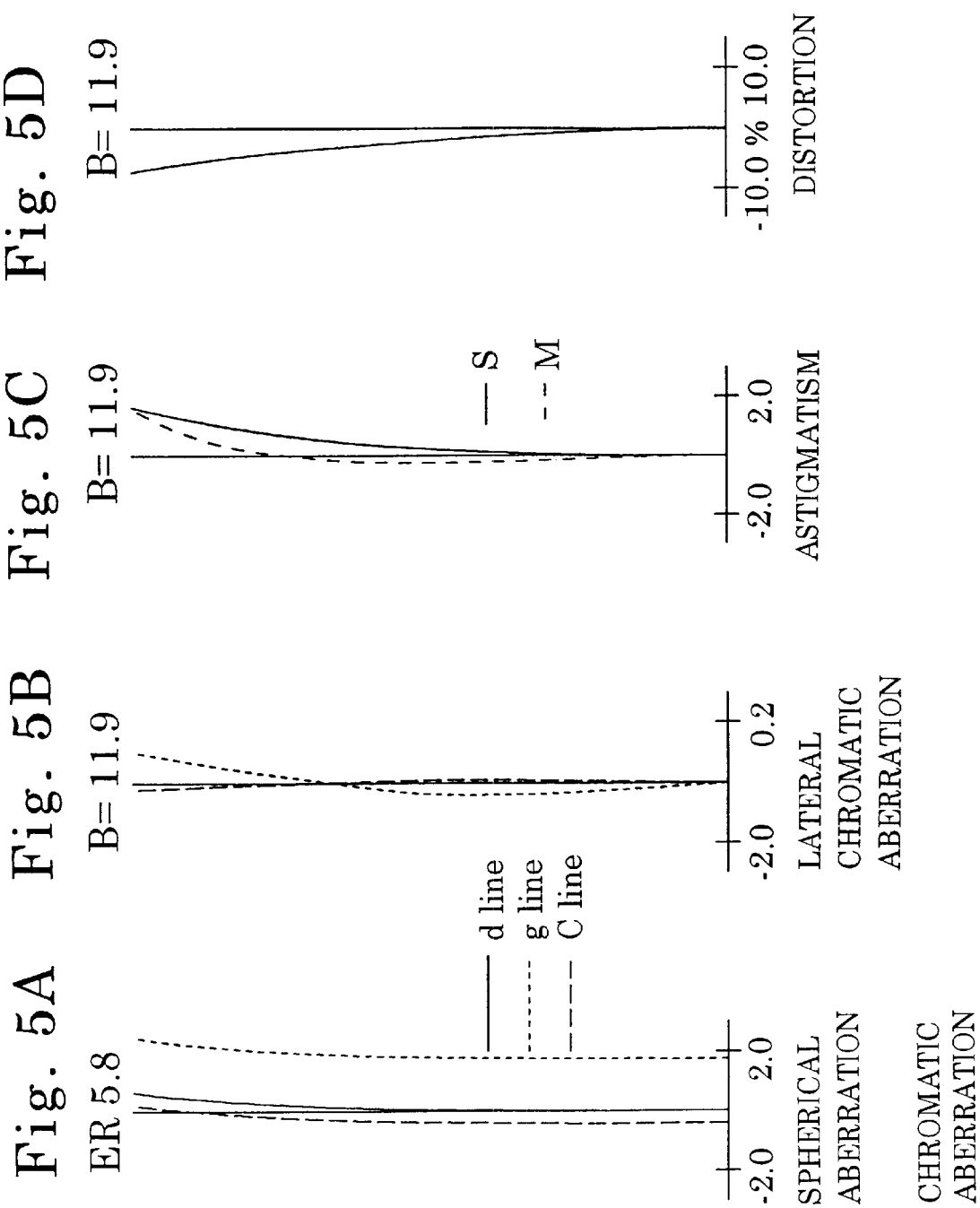
FIGS. 5A, 5B, 5C and 5D show aberration diagrams of the real-image optical system shown in FIG. 4.

FIGS. 1 through 3 show the real-image finder optical system according to the present invention. The real-image finder optical system includes an objective optical system 10, a plane mirror 21, a prism 20, a positive meniscus lens element 41, a plane mirror 26, and an eyepiece lens element 42, in this order from the object. The objective optical system 10 has positive power, and includes a negative lens element 11 and a positive lens element 12, in this order from the object. The positive meniscus lens element 41 and the eyepiece lens element 42 constitute an eyepiece optical system 40. The prism 20 has an incident surface 22, a first reflection surface 23, a second reflection surface 24 and an emitting surface 25, in this order from the object. Further, a convex surface having a predetermined radius of curvature is formed on the incident surface 22, so that the convex surface functions as a positive lens element 22p. In the embodiments, an image forming position (image forming plane) of the objective optical system 10 is made on the emitting surface 25 of the prism 20. Therefore the numeral 25 indicates both the emitting surface of the prism 20 and the image forming position (plane) of the objective optical system 10.

An inverted image, which is formed by the objective optical system 10, and is upside down and reversed from left to right, is erected to the proper orientation by an erecting optical system constituted by four reflection surfaces, i.e., the plane mirror 21, the reflection surfaces 23 and 24 of the prism 20, and the plane mirror 26. Further, the erected image is viewed through the eyepiece lens element 42.

The plane mirror 21 and the prism 20, i.e., three reflection surfaces constituting a part of the erecting optical system, are provided on the side of the object with respect to the image forming position 25 of the objective optical system 10. Therefore these three reflection surfaces could be considered to be a part of the objective optical system 10. On the other hand, the plane mirror 26 is provided on the side of the eyepiece optical system 40 with respect to the image forming position 25 of the objective optical system 10. Therefore the plane mirror 26 could be considered to be a part of the eyepiece optical system 40. The positive meniscus lens element 41 has a transverse magnification of more than 1, and thereby the focal length of the eyepiece optical system 40 is reduced with respect to the focal length of the eyepiece lens element 42. Accordingly, a higher finder magnification can be obtained, while a suitable eye relief is obtained by adjusting an angle, with respect to the optical axis, of an off-axis bundle of rays which is incident on the eyepiece lens element 42.

According to the optical arrangements of the embodiments, the reflection surface, along the optical path between the image forming position 25 of the objective optical system 10 and the eyepiece lens element 42, is the plane mirror 26 only, and therefore an optical path length (a space) necessary for providing the reflection surface can be shorter. Consequently, the focal length of the eyepiece lens element 42 can be shorter.

Furthermore, the plane mirror 21 and the prism 20 (the three reflection surfaces) are provided along the optical path between the positive lens element 12 of the objective optical system 10 and the image forming position 25 of the objective optical system 10. Therefore there are fewer factors which have to be considered when the optical path length is determined, so that miniaturization can easily be done. The above described factors are, for example, the apparent visual angle and an eye relief in the eyepiece optical system.

In the optical arrangements of the embodiments, it is preferable to form the exit pupil of the objective optical system 10 along the optical path from the negative lens element 11 and the positive lens element 12 in order to correct aberrations. At this time, since a bundle of principal rays is emitted from the exit pupil of the objective optical system 10 toward the image, it is understood that the farther the bundle of principal rays progresses, the larger the divergence thereof becomes. In other words, the divergence is smaller in the vicinity of the exit pupil. Accordingly, if the plane mirror 21 (the most object-side plane mirror) is positioned closer to the exit pupil, i.e., the positive lens element 12, the optical path length necessary to provide the plane mirror 21 can be made shorter. On the other hand, in a finder optical system for an optical instrument such as a camera and the like, a shape of a finder field of view is analogous (a rectangle with the major sides in the transverse direction) to the photographing area of the photographing optical system. Accordingly, the objective optical system 10 is arranged to form an image within a rectangular area, having major sides in the transverse direction, on the image forming plane 25; and the shape of the above rectangular area may be made to correspond to the shape of the emitting surface 25 of the prism 20. Furthermore, when the optical axis is deflected by the plane mirror 21, the deflecting of the optical axis in the direction along the major side of the rectangular finder field of view requires a longer optical path length than the deflecting of the optical axis in the direction along the minor side thereof.

Accordingly, as discussed in the embodiments, when a reflection surface (the plane mirror 21) which deflects the optical axis in the right-and-left direction is provided at the most object-side in the erecting optical system, the optical path length from the positive lens element 12 to the image can efficiently be made shorter. Therefore miniaturization of the optical system is attained, and at the same time, the correcting of aberrations by the objective optical system 10 becomes easier, so that optimum optical performance can be obtained. As shown in the embodiments, by forming the second and third reflection surfaces as the reflection surfaces of a prism, the optical path length from the positive lens element 12 to the image can be more reduced, and thereby the correcting of aberration by the objective optical system 10 can further be made easier.

However, in the case where the prism 20 is provided on the side of the object with respect to the image forming position 25 of the objective optical system 10, there is a possibility that transmission light quantity is reduced, and eclipse occurs in the finder field of view, because a bundle of principal rays emitted from the objective optical system 10 diverges, so that on the reflection surfaces 23 and 24, a part of the bundle of rays does not satisfy the condition of total reflection. This can be solved by providing the positive lens element 22p on the side of the object with respect to the prism 20 so that the bundle of principal rays to be incident on the prism 20 is made substantially parallel. On the other hand, it should be noted that the closer the positive lens element 22p is positioned to the exit pupil of the objective optical system 10, the stronger the power of the positive lens element 22p has to be. As a result, spherical aberration and coma occur excessively. Therefore in order to achieve optimum optical performance, it is necessary to position the positive lens element 22p closer to the image forming position 25 of the objective optical system 10. By positioning the positive lens element 22p between the plane mirror 21 and the prism 20, and the positive lens element 22p is designed to satisfy condition (1), the above described problems can be solved without providing the positive lens element 22p with excessively strong power. In other words, by placing the front focal point of the positive lens element 22p in the vicinity of the exit pupil of the objective optical system 10, the bundle of principal rays to be incident on the prism 20 can be made substantially parallel, so that the condition of total reflection is satisfied on the reflection surfaces 23 and 24. The positive lens element 22p is integrally formed on the incident surface 22 of the prism 20 in order to reduce the number of elements and reduce production costs accordingly; however, the positive lens element 22p can be made separately from the prism 20.

In the case where the emitting surface 25 of the prism 20 is placed on the image forming position of the objective optical system 10, and at the same time, finder-field information, such as a field frame and a distance-measuring marks and the like, is formed on the emitting surface 25, the finder-field information can be indicated in a manner that the same is superimposed on the finder image. According to this arrangement, since the incident surface 22 of the prism 20 and the emitting surface 25 are sufficiently separate from each other, scratches or foreign matter on the incident surface 22 are not made noticeable.

Condition (1) specifies the positive lens element 22p; however, whether or not the positive lens element 22p is integrally formed with the prism 20 is not required.

If L/fc exceeds the lower limit of condition (1), the focal length of the positive lens element 22p becomes too long, and thereby a bundle of rays to be incident on the prism 20 cannot satisfy the condition of total reflection. Accordingly, transmission light quantity is reduced, and eclipse in the finder field of view occurs.

If L/fc exceeds the upper limit of condition (1), the focal length of the positive lens element 22p becomes too short. Further, a space for placing the plane mirror 21 cannot be secured, and aberrations occur due to the strong power of the positive lens element 22p.

Specific numerical data of the embodiments will be described hereinafter. In the tables and diagrams, W designates the incident angle (real field of view (half amount)) (°), D designates the diopter (m$^{-1}$), R designates the radius of curvature of each lens surface, d designates the lens thickness or the distance between the lens elements, $N_d$ designates the refractive index at the d-line, and υ designates the Abbe number. In the diagrams of chromatic aberration represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. Furthermore, in the aberration diagrams, ER designates the diameter of the exit pupil (mm), and B designates the emitting angle (apparent visual angle (half amount)) (°).

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10} \ldots ;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 4 is the optical arrangement the real-image finder optical system according the first embodiment; FIGS. 5A, 5B, 5C and 5D show aberration diagrams of the real-image optical system shown in FIG. 4; and Table 1 shows the lens data thereof.

TABLE 1

W = 28.82
D = −1.014

| Surface No. | R | d | Nd | ν |
|---|---|---|---|---|
| 1* | −12.023 | 1.30 | 1.58547 | 29.9 |
| 2* | 24.051 | 9.50 | — | — |
| 3* | 10.471 | 1.70 | 1.49176 | 57.4 |
| 4 | −9.260 | 7.00 | — | — |
| 5* | 11.314 | 10.68 | 1.49176 | 57.4 |
| 6 | ∞ | 3.55 | (image forming plane) | |
| 7 | −15.000 | 1.80 | 1.49176 | 57.4 |
| 8* | −12.402 | 11.80 | — | — |
| 9* | 13.451 | 2.50 | 1.49176 | 57.4 |
| 10 | −24.470 | — | — | — |

*designates the aspherical surface which is rotationally symmetric with respect to the optical axis.

Aspherical surface data (the aspherical surface coefficients not indicated are zero (0.00)):

| Surface No. | K | A4 | A6 |
|---|---|---|---|
| 1 | 0.00 | 0.1483 × 10$^{-2}$ | −0.1144 × 10$^{-5}$ |
| 2 | 0.00 | 0.1212 × 10$^{-2}$ | 0.6300 × 10$^{-4}$ |
| 3 | 0.00 | −0.5920 × 10$^{-3}$ | 0.1820 × 10$^{-4}$ |
| 5 | 0.00 | −0.2090 × 10$^{-3}$ | 0.5970 × 10$^{-5}$ |
| 8 | 0.00 | −0.8340 × 10$^{-3}$ | 0.5940 × 10$^{-5}$ |
| 9 | 0.00 | −0.2106 × 10$^{-3}$ | 0.1160 × 10$^{-5}$ |

[Embodiment 2]

Figure 6:
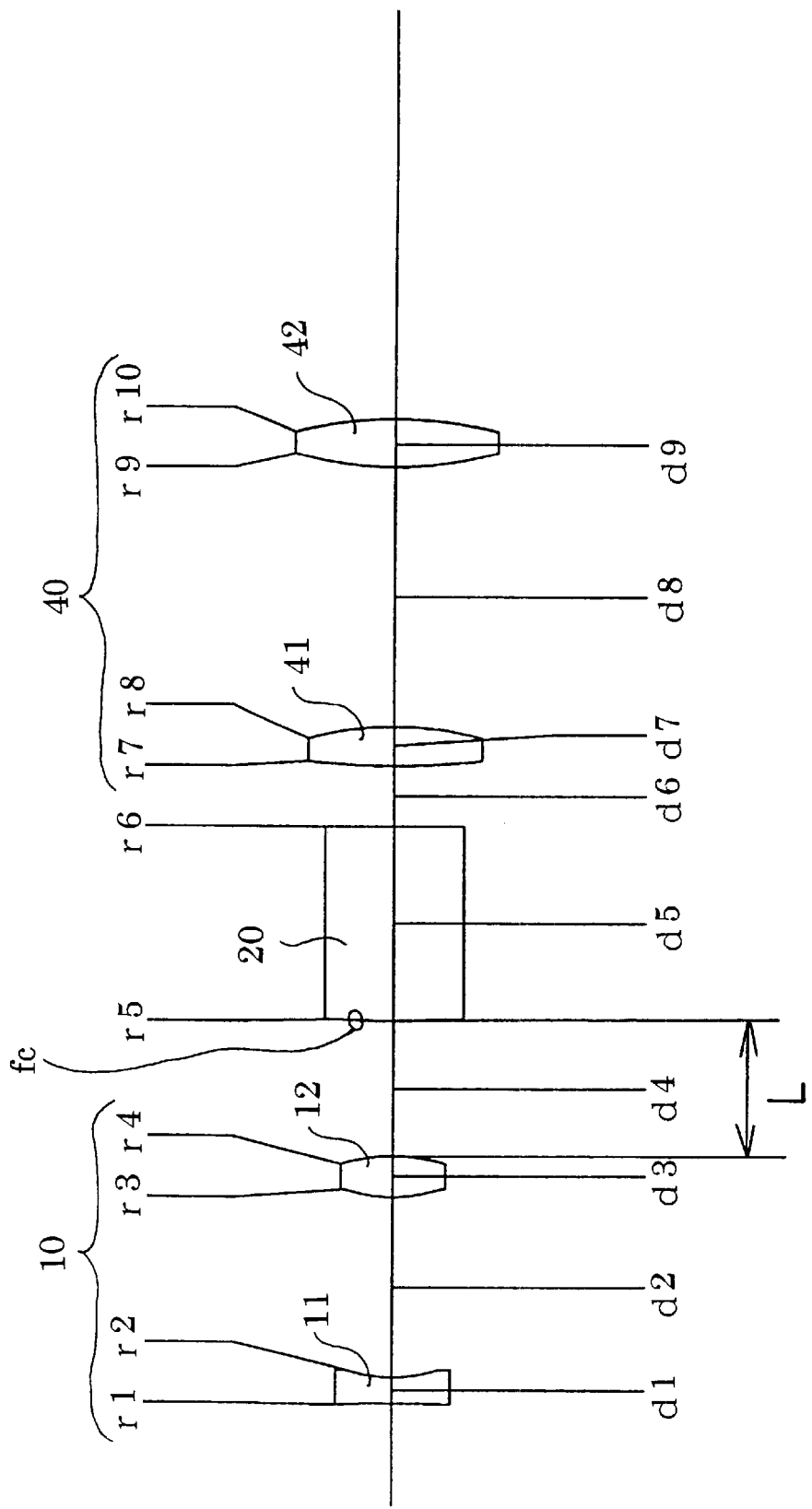
FIG. 6 is an optical arrangement the real-image finder optical system according a second embodiment.

FIG. 6 is the optical arrangement the real-image finder optical system according the second embodiment; FIGS. 7A, 7B, 7C and 7D show aberration diagrams of the real-image optical system shown in FIG. 6; and Table 2 shows the lens data thereof.

TABLE 2

W = 28.89
D = −1.017

| Surface No. | R | d | Nd | ν |
|---|---|---|---|---|
| 1* | −44.980 | 1.30 | 1.58547 | 29.9 |
| 2* | 7.000 | 8.81 | — | — |
| 3* | 7.256 | 2.00 | 1.49176 | 57.4 |
| 4 | −8.775 | 6.60 | — | — |
| 5* | 26.307 | 9.60 | 1.49176 | 57.4 |
| 6 | ∞ | 3.00 | (imaging plane) | |
| 7 | 40.400 | 1.90 | 1.49176 | 57.4 |
| 8* | −17.256 | 12.92 | — | — |
| 9* | 16.027 | 2.40 | 1.49176 | 57.4 |
| 10 | −21.300 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 1 | 0.00 | $0.1200 \times 10^{-3}$ | $-0.3000 \times 10^{-5}$ | — |
| 2 | 0.00 | $-0.3950 \times 10^{-3}$ | $0.2800 \times 10^{-4}$ | — |
| 3 | 0.00 | $-0.9730 \times 10^{-3}$ | $0.3940 \times 10^{-5}$ | — |
| 5 | 0.00 | $-0.1037 \times 10^{-2}$ | $-0.7000 \times 10^{-6}$ | — |
| 8 | 0.00 | $-0.1335 \times 10^{-3}$ | $0.1090 \times 10^{-6}$ | — |
| 9 | 0.00 | $-0.1434 \times 10^{-3}$ | $0.3270 \times 10^{-6}$ | $0.2270 \times 10^{-8}$ |

Table 3 shows the numerical values for condition (1) of each embodiment.

TABLE 3

| | Embodiment 1 | Embodiment 2 |
|---|---|---|
| L/fc | 0.304 | 0.123 |
| L | 7.000 | 6.600 |
| fc | 23.007 | 53.496 |

As can be understood from Table 3, each embodiment satisfies condition (1).

According to the present invention, a miniaturized real-image finder optical system, in which the focal length of the eyepiece optical system is shorter, and the finder magnification and the apparent visual angle are increased, can be obtained.

What is claimed is:

1. A real-image finder optical system comprising:

a positive objective optical system in which an image of an object, being upside down and reversed from left to right, is formed;

an erecting optical system, having a plurality of reflection surfaces, in which said image formed by said objective optical system is erected to the same orientation as said object; and an eyepiece optical system through which said image erected by said erecting optical system is viewed;

wherein a shape of a finder field of view is a rectangle having major sides along the transverse direction in said finder field of view;

wherein along the optical path on the side of said object with respect to said image formed by said objective optical system, at least three reflection surfaces of said erecting optical system are provided, and wherein the most object-side reflection surface among said three reflection surfaces is positioned so that the optical axis is deflected in a direction along said major side of said rectangular finder field of view.

2. The real-image finder optical system according to claim 1, wherein among said three reflection surfaces, a second reflection surface and a third reflection surface, in this order from said object, are two reflection surfaces of a prism.

3. The real-image finder optical system according to claim 1, wherein among said three reflection surfaces, between the most object-side reflection surface and a second reflection surface in this order from said object, a positive lens element is provided.

4. The real-image finder optical system according to claim 1, wherein among said three reflection surfaces, a second reflection surface and a third reflection surface, in this order from said object, are two reflection surfaces of a prism, and wherein a positive lens element is integrally formed on an incident surface of said prism.

5. The real-image finder optical system according to claim 3, wherein the following condition is satisfied:

$$0.1 < L/fc < 0.7$$

wherein

L designates the distance between the most image-side surface of said objective optical system and said positive lens element; and fc designates the focal length of said positive lens element.

6. The real-image finder optical system according to claim 2, wherein an emitting surface of said prism is provided on an image forming position of said objective optical system.

7. The real-image finder optical system according to claim 6, wherein on said emitting surface of said prism, finder-field information is formed.

* * * * *